(12) United States Patent
    Martin

(10) Patent No.: US 9,137,952 B1
(45) Date of Patent: Sep. 22, 2015

(54) METHOD AND SYSTEM OF GROWING SOILLESS SOD

(71) Applicant: James Jay Martin, Oklahoma City, OK (US)

(72) Inventor: James Jay Martin, Oklahoma City, OK (US)

( * ) Notice: Subject to any disclaimer, the term of this patent is extended or adjusted under 35 U.S.C. 154(b) by 190 days.

(21) Appl. No.: 13/855,224

(22) Filed: Apr. 2, 2013

Related U.S. Application Data

(60) Provisional application No. 61/686,304, filed on Apr. 3, 2012.

(51) Int. Cl.
    *A01G 9/02*    (2006.01)
    *A01G 9/10*    (2006.01)

(52) U.S. Cl.
    CPC ........................................ *A01G 9/10* (2013.01)

(58) Field of Classification Search
    USPC ............. 47/65.5, 66.7, 73, 1.01 F, 65.9, 32.7, 47/32.8
    See application file for complete search history.

(56) References Cited

U.S. PATENT DOCUMENTS

| | | | |
|---|---|---|---|
| 5,481,827 A | 1/1996 | Decker | |
| 5,581,936 A * | 12/1996 | Belgiorno | ...................... 47/65.5 |
| 5,651,213 A | 7/1997 | Egan | |
| 5,765,304 A | 6/1998 | Clark | |
| 5,860,246 A | 1/1999 | Strombom | |
| 6,293,045 B1 | 9/2001 | Morgan | |
| 6,324,781 B1 | 12/2001 | Stevens | |
| 6,334,275 B1 | 1/2002 | Egan | |
| 6,357,176 B2 | 3/2002 | Baldwin et al. | |
| 6,389,745 B1 | 5/2002 | Huh | |
| 6,446,386 B1 | 9/2002 | Holloway | |
| 6,601,342 B2 * | 8/2003 | Dummen | ...................... 47/62 C |
| D487,035 S * | 2/2004 | Bellavics | ...................... D11/155 |
| 7,082,718 B2 * | 8/2006 | Dummen | ........................... 47/86 |
| 7,946,078 B1 * | 5/2011 | VanWingerden | .................. 47/73 |
| 2002/0007592 A1 * | 1/2002 | Mischo | ........................... 47/65.9 |
| 2002/0035803 A1 * | 3/2002 | Dummen | ........................... 47/73 |
| 2009/0260284 A1 * | 10/2009 | Barbalho | ........................ 47/65.9 |
| 2012/0279125 A1 * | 11/2012 | Nusca et al. | ................... 47/66.7 |
| 2014/0090294 A1 * | 4/2014 | VanWingerden | .............. 47/66.7 |
| 2014/0250782 A1 * | 9/2014 | Visser et al. | ................... 47/65.9 |

* cited by examiner

*Primary Examiner* — Kristen C Hayes
(74) *Attorney, Agent, or Firm* — Martin G. Ozinga; Phillips Murrah PC

(57) ABSTRACT

A growing tray system for growing soilless plants and sod utilizing trays for growing plants and sod without soil wherein the trays are easily stackable, movable, and are contoured with shapes such that roots may grow downward around the contoured shapes promoting interwoven geometric root structures.

1 Claim, 21 Drawing Sheets

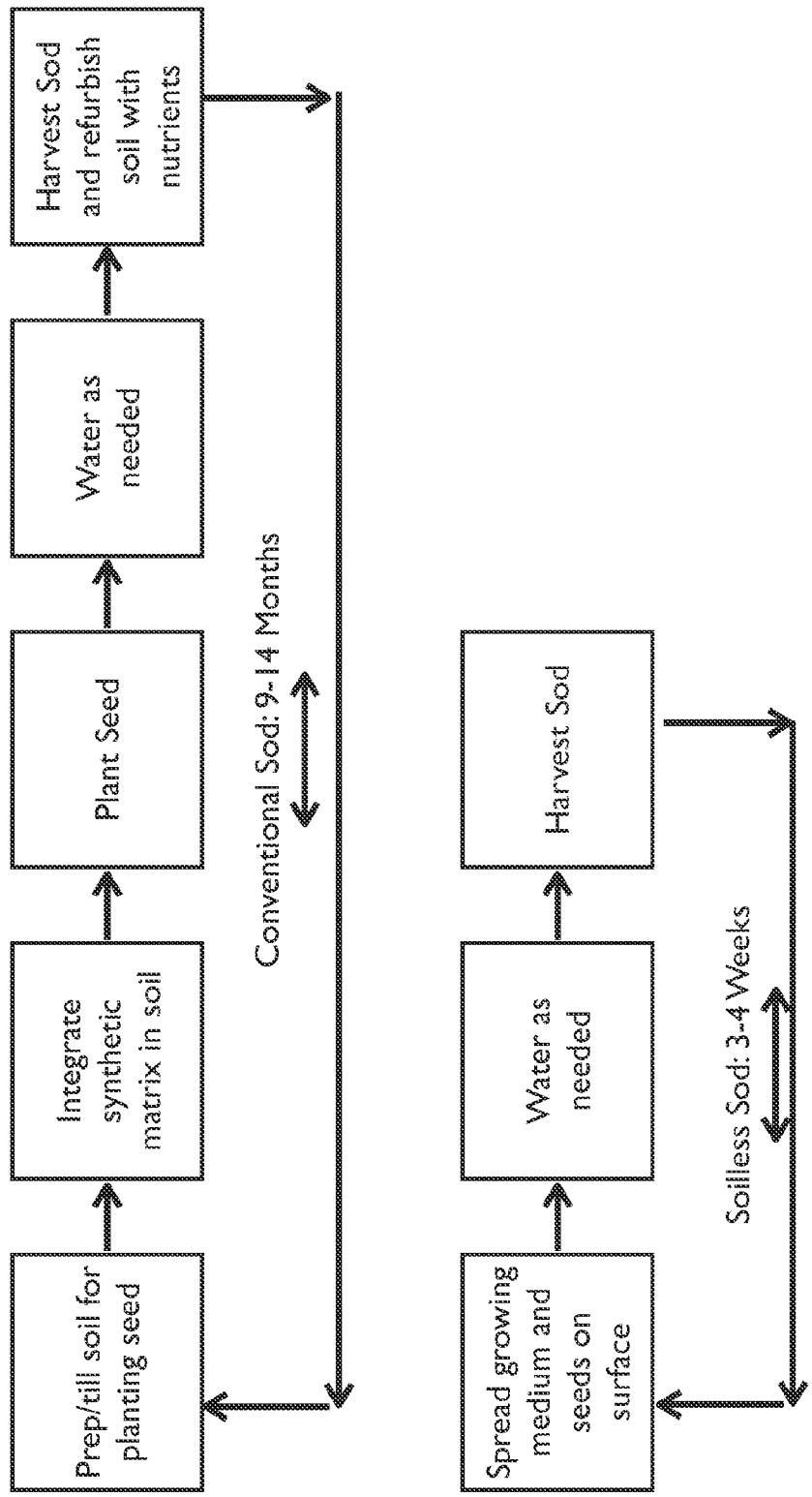

Figure 1:
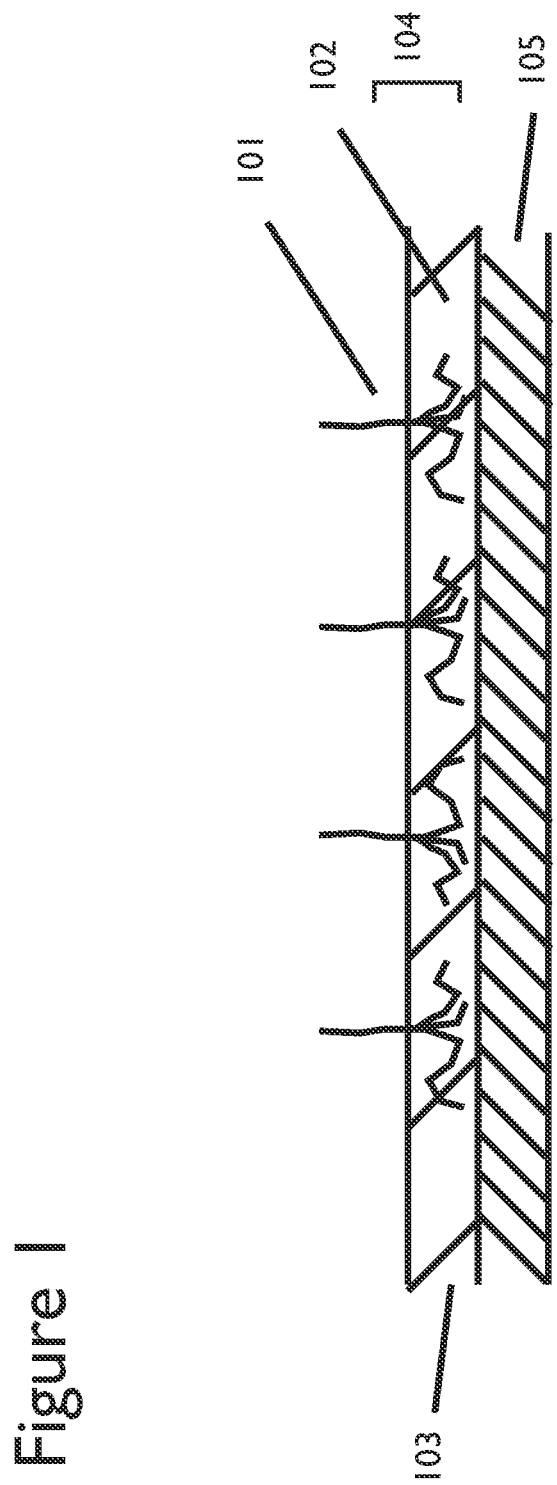

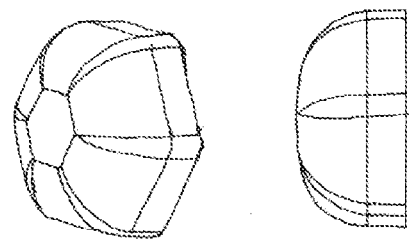
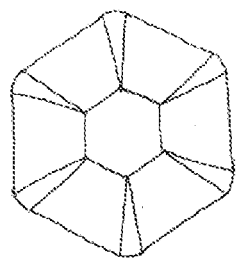
Figure 10
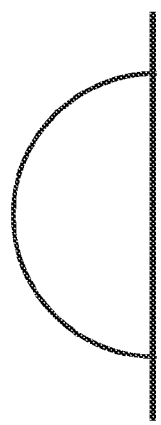
Figure 8
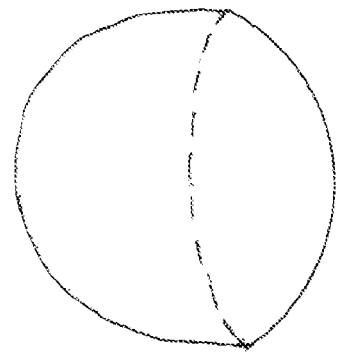
Figure 9

1101

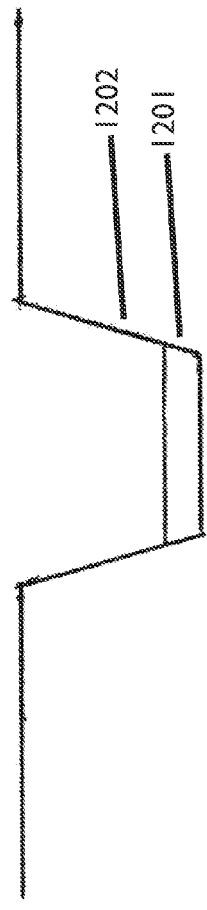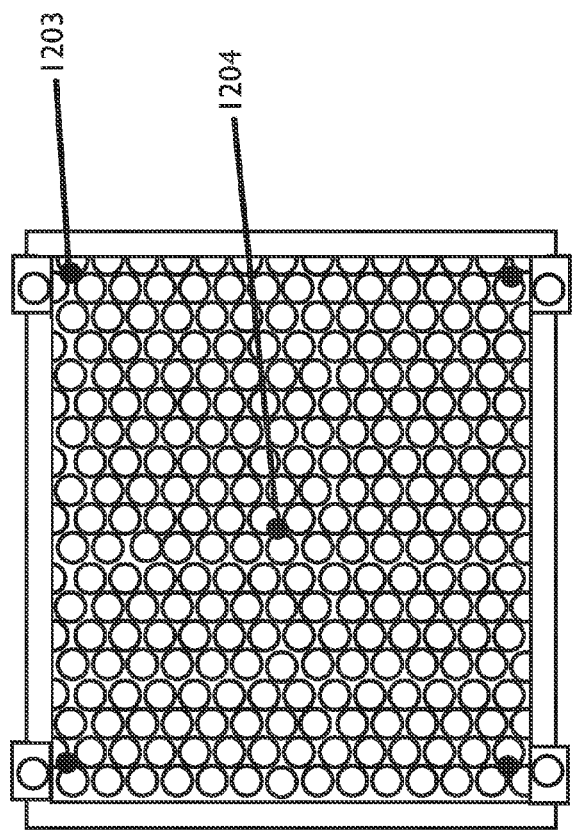
Figure 12A
Figure 12B

2001

METHOD AND SYSTEM OF GROWING SOILLESS SOD

CROSS-REFERENCE TO RELATED APPLICATIONS

Priority is claimed from provisional application U.S. Ser. No. 61/686,304 filed on Apr. 3, 2012 and incorporated by reference herein.

BACKGROUND OF THE INVENTION

1. Field of the Invention

The present invention relates generally to a novel apparatus, system and method of growing soilless sod. More particularly, the present invention utilizes trays for growing sod without soil wherein the trays are easily stackable, movable, and contoured with shapes such that roots may grow downward around the proximal surface of the shapes to promote interwoven root structure.

2. Description of the Prior Art

Growing soil-free sod has been pursued for many years, and with many implementations, however, there remain significant limitations to current methods of growing soil-free sod.

Conventional sod growing methods typically consist of planting sod in soil. Limitations with this approach require the scraping off of the top layer of soil upon harvesting. In doing so, the soil often requires injections of additional nutrients for subsequent crops, resulting in environmental pollution issues. Additionally, to expedite the harvesting of the sod, plastic webbing is often integrated in with the growing of the sod, which results in long-term, unattractive, and environmentally damaging plastic that remains in the sod for many years to come. Sod harvesting typically occurs at nearly one year after planting, therefore requiring expansive land areas to grow such sod. Because of such a large land area that is required, sod farms are often located at a distance from where the sod is ultimately sold or laid. The process of harvesting, transporting, and planting the sod requires expensive equipment, is messy, labor intensive, and inefficient. Due to the way that conventional sod is harvested, much of the root structure is damaged and results in the harvested sod often dying or being shocked, taking it significantly longer to regain its healthy, vibrant look. Because of these and the many other limitations of conventional sod growing and harvesting methods, the introduction of soil-free sod growing has been pursued.

Current approaches of growing soil-free sod consist of growing the sod on plastic sheeting, rubber mats, concrete, or other hardened and/or impermeable surfaces. In such cases, a growing medium (such as various sources or types of cellulosic material mixed with various nutrients) is placed over the hardened or impervious surface, which has the sod grass source mixed in (seeds, sprigs, stalons, plugs, etc), is watered, and the sod germinates and/or grows. The result of growing soil-free sod produces a product that it is faster, lighter, stronger, healthier, more environmentally friendly, and more cost-effective to grow than conventional growing methods. There are many advantages of growing soil-less sod, but there also remain practical challenges, which need to be overcome to make it practically implemented on a broad scale.

When the growing medium is spread over a broad surface, it becomes susceptible to various weather conditions, which can quickly destroy a crop. For instance, wind and rain both pose significant challenges to soilless sod during the early part of the growing cycle. Wind can blow away the growing medium. Once the root structure begins to form within the growing medium as a laterally interwoven root system, creating a large flat mat-like structure, wind can catch under its edge, and lift large sections of the mat-like structure, destroying the sod. Rain can also wash away sections of the growing medium. With typical soilless sod growing techniques, a large area of surface is covered by the growing medium, but upon heavy rain, and the channeling effects of runoff, the growing medium can easily become washed away. Keeping the germinating seeds or grass at a preferred moisture level can be challenging too. The wet/dry cycle of the growing medium can be challenging to control. Because the growing medium is typically relatively thin, it can quickly dry out and kill the newly germinated seeds.

The growing surface itself can also be largely effected by environmental factors. Plastic sheeting has been used to grow soilless sod, but due to the Bernoulli's effect, amongst other conditions, the surface can be lifted by wind. Even staking down the plastic sheeting has numerous challenges to growing, and harvesting, as it fails to fully eliminate section lifting of the material, and introduces challenges for harvesting, as the sheeting can be fragile. Other methods, such as growing on stabilized soil, offers their own set of environmental and cost challenges. These surfaces can wear down over time, can be difficult to apply evenly over a broad area, and do not eliminate the wind or rain issues.

Flatt, et al, describes a method of growing soilless sod on a polymer-based surface. Such an application overcomes several of the challenges of alternative soilless sod growing methods, namely by reducing cost of preparing the surface compared to concrete, increasing the durability and practicality over plastic sheeting, and offering the many advantages previously discussed over conventional soil-based growing of sod. However, environmental issues such as wind and rain still pose a challenge to this approach.

Prior art may be Egan (PN 6334275) that describes a method of providing preparing sports surfaces using transportable turf grass. Edan (PN 5651213) describes the production of sod using a soilless sand based root medium. Decker (PN 5481827) describes a method for manufacturing sod. Strombom (PN 5860246) describes a sod mat for establishing plants. Clark (PN 5765304) describes a turf-growing process. Holloway (PN 6446386) describes a seed germination medium. Huh (PN 6389745) describes a sheet for growing grass seeds and grass seed mat using the same. Baldwin, et al, (PN 6357176) describes a soilless sod method. Stevens (PN 6324781) describes a mulch or seed mat. Morgan (PN 6293045) describes a biodegradable mulch mat. Each of the above fail to fully meet the needs of growing soilless sod on a large scale, and meeting the practicalities of production.

SUMMARY OF THE INVENTION

The present invention relates generally to a new and improved method of growing soilless sod. Specifically, the present invention may additionally provide many advantages over the prior art, and overcome many of the challenges that other approaches face.

The present invention relates generally to a novel apparatus, system and method of growing soilless sod utilizing trays wherein the trays are easily stackable, movable, and contoured to promote interwoven root structure. The contour of the surface utilized to grow the sod without soil may be a series of raised circular bumps that promote the growth of the roots to intertwine. It is understood that numerous configurations, contours, and shape of contours are contemplated.

In this respect, before explaining at least one embodiment of the invention in detail, it is to be understood that the invention is not limited in this application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore that the claims be regarded as including such equivalent constructions insofar as they do not depart from the spirit and scope of the present invention.

Accordingly, titles, headings, chapters name, classifications and overall segmentation of the application in general should not be construed as limiting. Such are provided for overall readability and not necessarily as literally defining text or material associated therewith.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved method of growing sod.

It is a further object of the present invention to provide a new and improved method of growing soilless sod.

It is a further object of the present invention to provide reduced time from planting to harvesting for growing soilless sod.

It is a further object of the present invention to provide a more environmentally friendly method of growing soilless sod.

It is a further object of the present invention to reduce the costs of growing soilless sod.

It is a further object of the present invention to reduce the amount of growing medium required for the growing of soilless sod.

It is a further object of the present invention to provide a method of growing soilless sod that reduces labor/manpower requirements.

It is a further object of the present invention to reduce the need for expensive equipment for the preparation, growing and/or harvesting of soilless sod.

It is a further object of the present invention to lessen repercussions of wind and rain on growing soilless sod.

It is a further object of the present invention to provide a method of growing healthier soilless sod.

It is a further object of the present invention to enable a typical sod-layer to grow their own soilless sod.

It is a further object of the present invention to reduce the amount of water required to grow soilless sod.

It is a further object of the present invention to grow soilless sod on less land area.

It is a further object of the present invention to enable the growing of soilless sod in more types of areas.

It is a further object of the present invention to provide an improved method of harvesting soilless sod to make laying sod easier.

It is a further object of the present invention to provide a method of harvesting sod without requiring a synthetic matrix to strengthen the sod.

Still another object to the present invention to provide a new and improved apparatus, which optimizes the conditions for growing soilless sod.

It is a further object of the present invention to provide an economically manufacturable apparatus to enable the growing of such soilless sod.

It is a further object of the present invention to not require expensive or expansive ground preparation for growing soilless sod.

It is a further object of the present invention to provide an efficiently repeatable method of growing soilless sod.

It is a further object of the present invention to provide a method of growing sod in a more environmentally friendly way.

Another object of the present invention is to provide a new and improved system which provides some of the advantages of the prior art, while simultaneously overcoming some of the disadvantages normally associated therewith.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference would be had to the accompanying drawings and descriptive matter in which there are illustrated preferred embodiments of the invention.

BRIEF DESCRIPTION OF THE PICTORIAL ILLUSTRATIONS, GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings, and appendices.

FIG. 1 generally illustrates a cross section view of a method of growing conventional sod.

Figure 2:
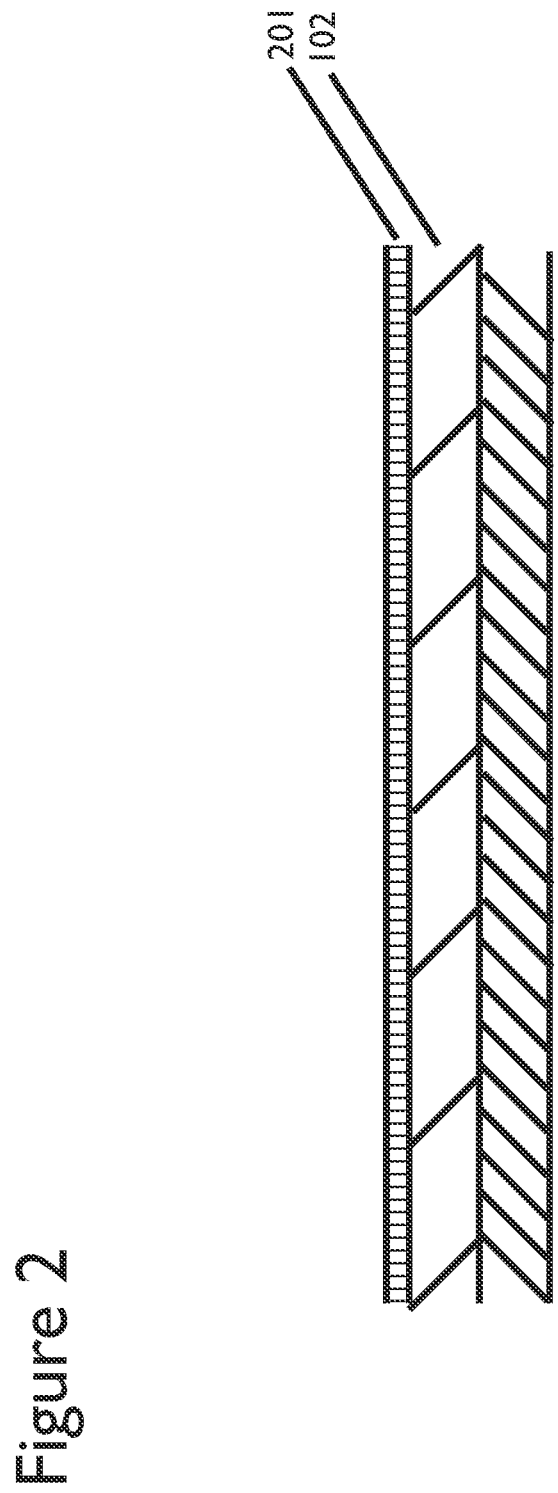

FIG. 2 generally illustrates a cross section view of the surface used for growing soilless sod.

Figure 3A:
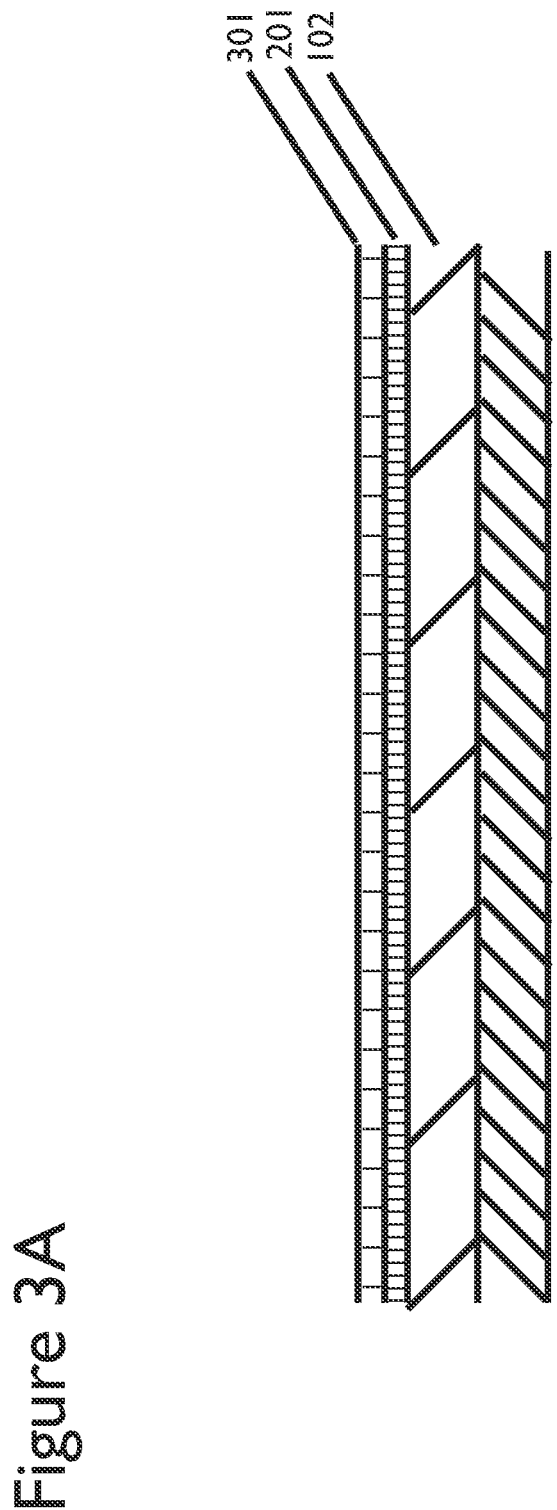

FIG. 3A generally illustrates a cross section view of growing medium over a surface used for growing soilless sod.

Figure 3B:
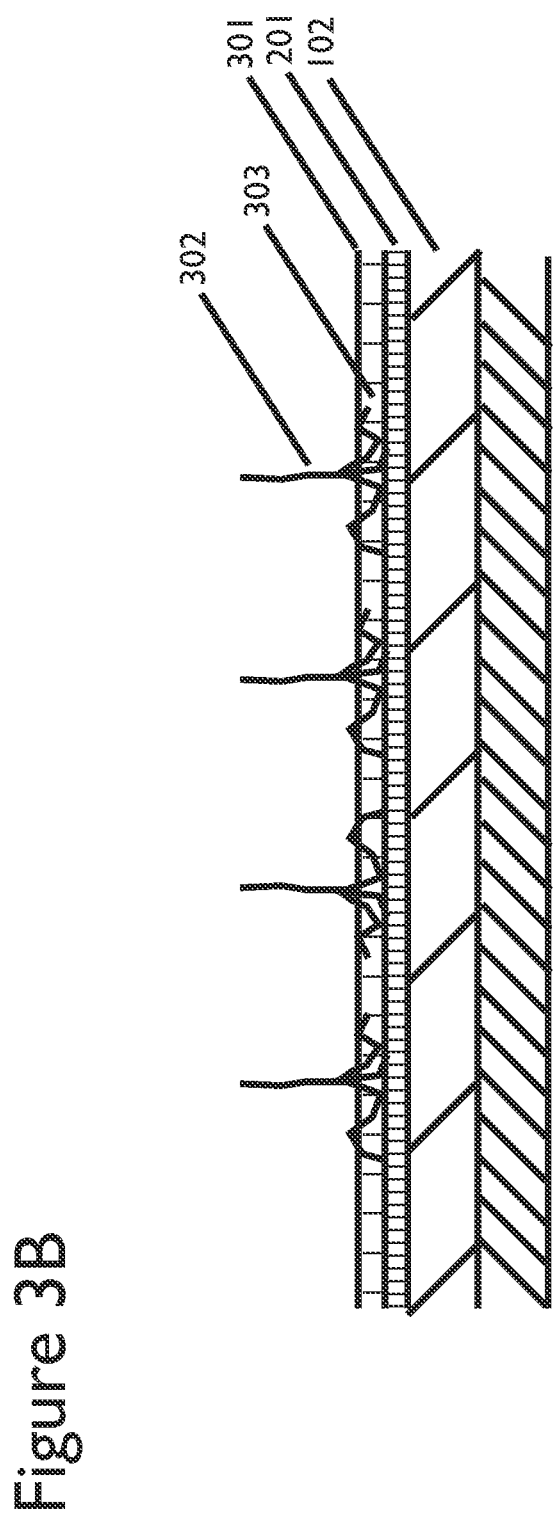

FIG. 3B generally illustrates a cross section view of growing medium with germinated plants within such growing medium, over a surface used for growing soilless sod.

FIG. 4 generally illustrates a block diagram describing a process for planting, growing, and harvesting conventional sod versus soilless sod.

Figure 5A:
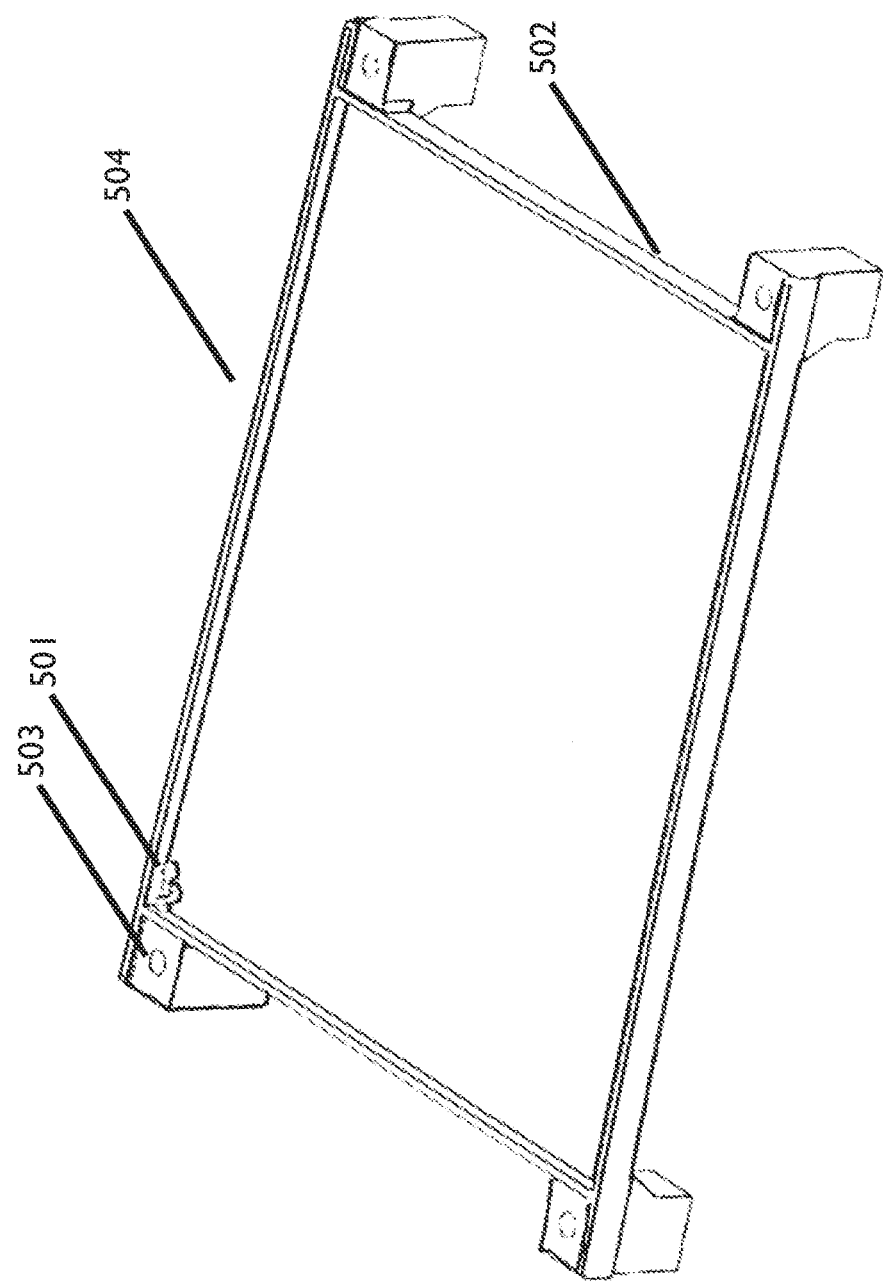

FIG. 5A generally illustrates a perspective view of one embodiment of a growing tray, not showing the full growing surface.

Figure 5B:
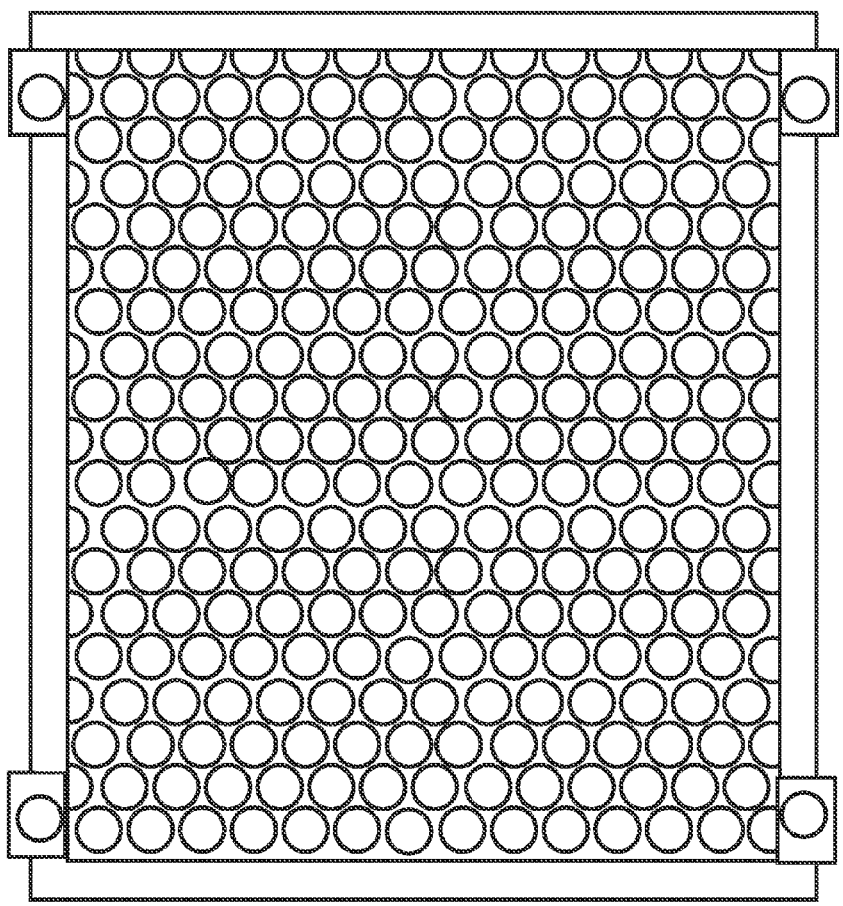

FIG. 5B generally illustrates a proximal view of one embodiment of a growing tray showing nested domes, and support legs, not necessarily drawn to scale.

Figure 6A:
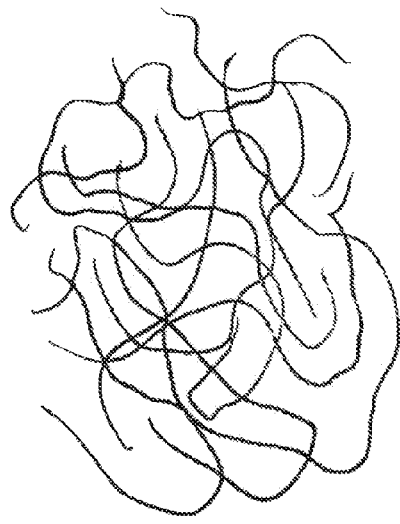

FIG. 6A generally illustrates interwoven root growing pattern within conventional sod growing means, including conventional soilless sod growing means.

Figure 6B:
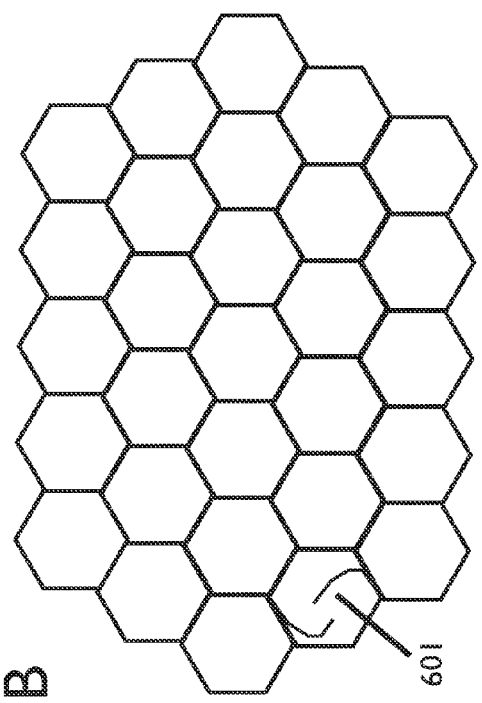

FIG. 6B generally illustrates interwoven root growing pattern within a tray with engineering-enhanced natural root guidance around growing surface shapes.

Figure 7A:
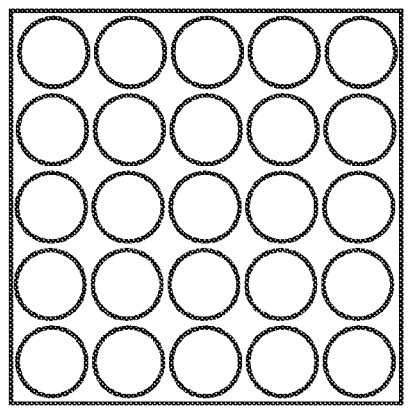

FIG. 7A generally illustrates a proximal view of one embodiment of a growing surface.

Figure 7B:
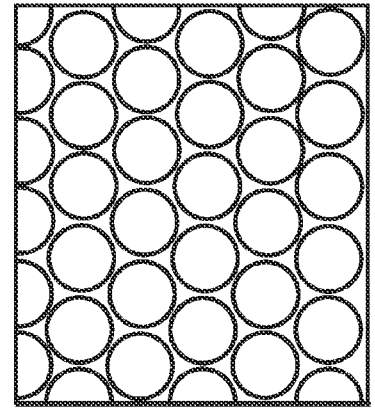

FIG. 7B generally illustrates a proximal view of a preferred embodiment of a growing surface.

FIG. 8 generally illustrates one embodiment of a dome shape growing medium volume reducers.

FIG. 9 generally illustrates a perspective view of one embodiment of the growing medium volume reducers.

FIG. 10 generally illustrates various orientations of a preferred embodiment of the growing medium volume reducers in a domed hexagonal pattern.

Figure 11A:
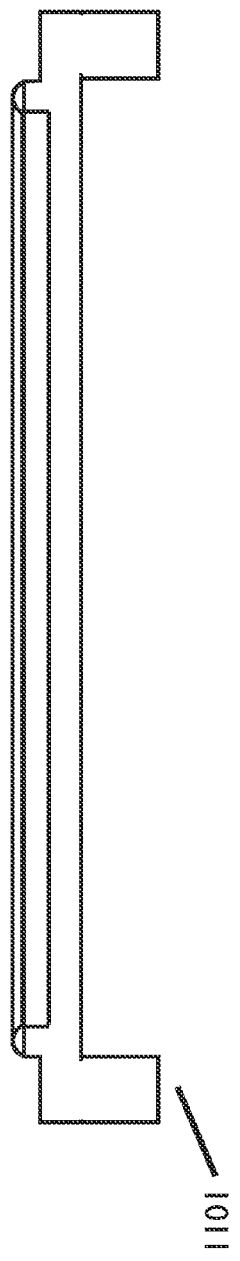

FIG. 11A generally illustrates a cross-sectional view of a tray.

Figure 11B:
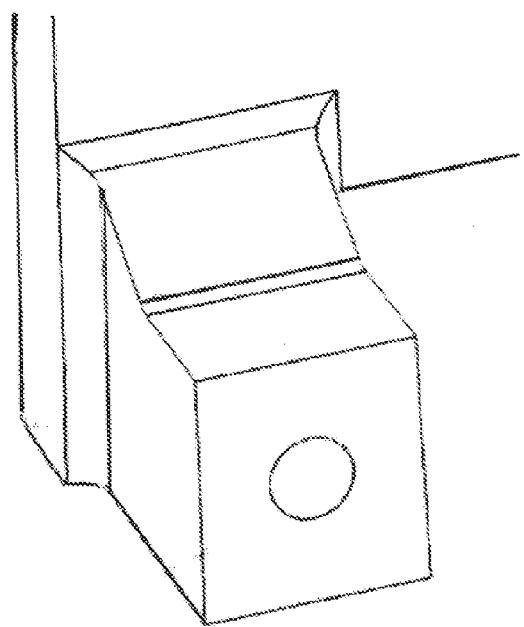

FIG. 11B generally illustrates a distal perspective view of a leg of a tray.

FIG. 12A generally illustrates one embodiment of a perimeter wall water port.

FIG. 12B generally illustrates a proximal view of distally oriented water ports.

Figure 13C:
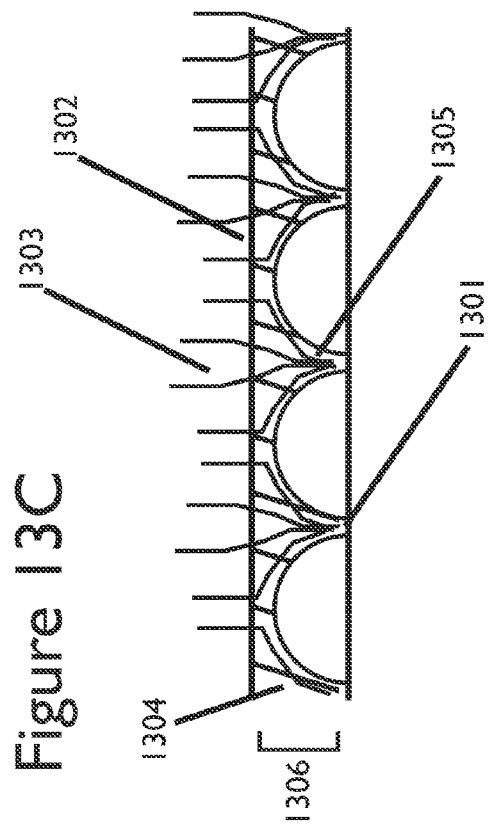
Figure 13A:
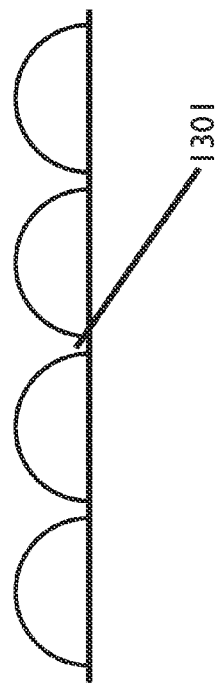

FIG. 13A generally illustrates a cross-sectional view of dome shapes across a growing surface.

Figure 13B:

FIG. 13B generally illustrates growing medium above and in between dome shapes across a growing surface.

FIG. 13C generally illustrates the root path of plants growing above and around dome shapes across a growing surface.

Figure 14:
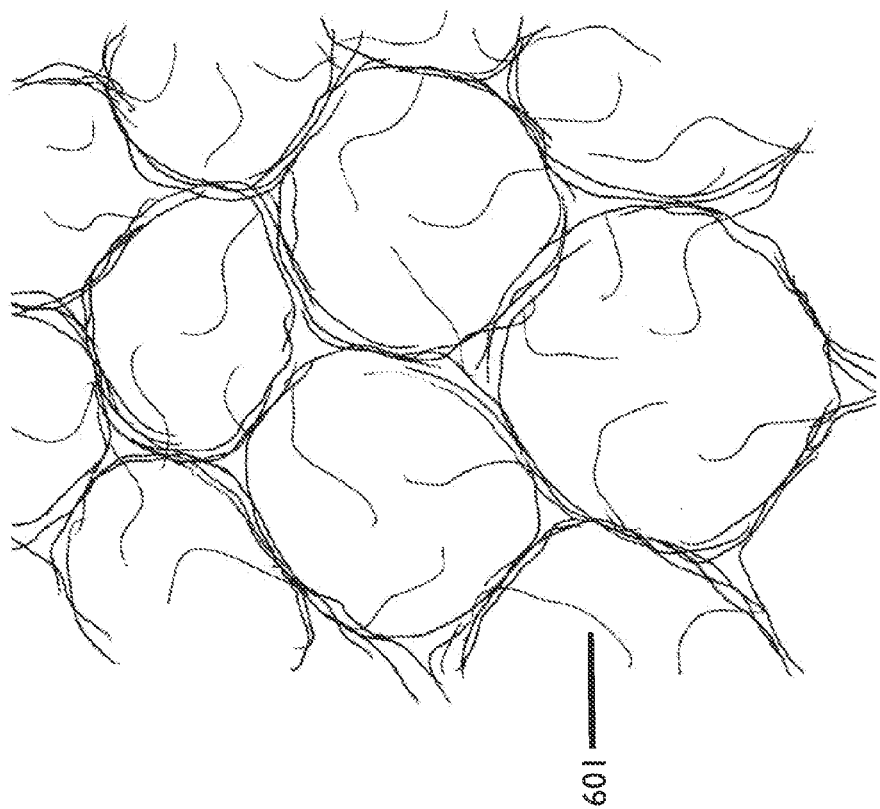

FIG. 14 generally illustrates the distal perspective of root structure of sod after having been removed from the growing trays.

Figure 15:
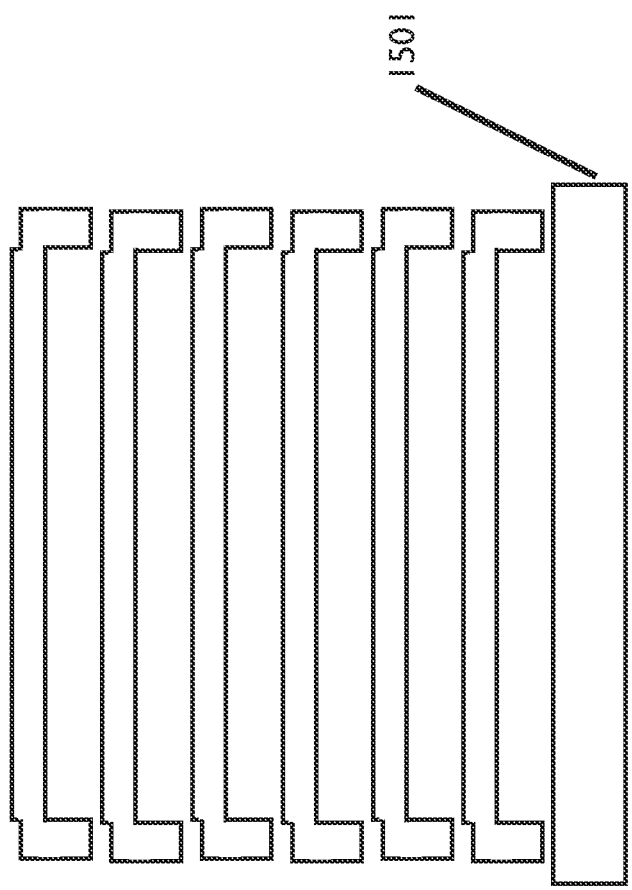

FIG. 15 generally illustrates growing trays in a stacked orientation above a pallet.

Figure 16A:
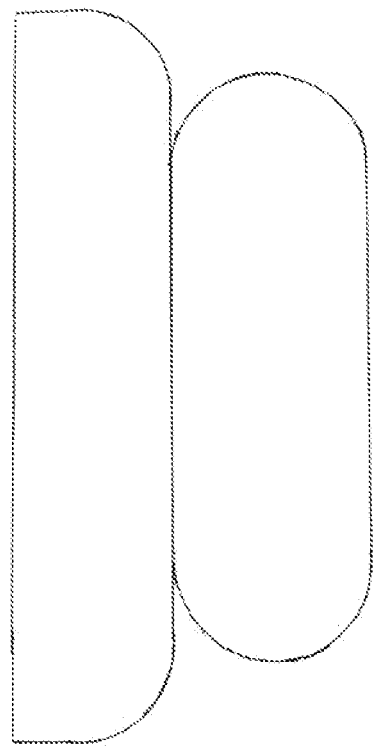

FIG. 16A generally illustrates a flat perspective of a three-dimensional structure cutout form of a window box.

Figure 16B:
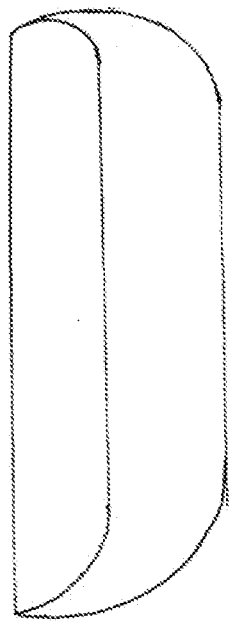

FIG. 16B generally illustrates a perspective view of sod folded into a window box shape.

Figure 17A:
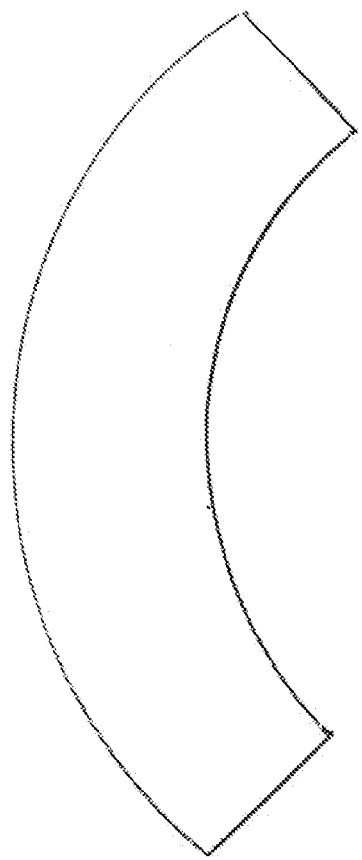

FIG. 17A generally illustrates a flat perspective of a three-dimensional structure cutout form of a plant pot shape.

Figure 17B:
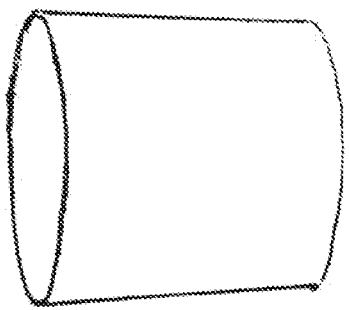

FIG. 17B generally illustrates a perspective view of sod folded into a plant pot shape.

Figure 18:
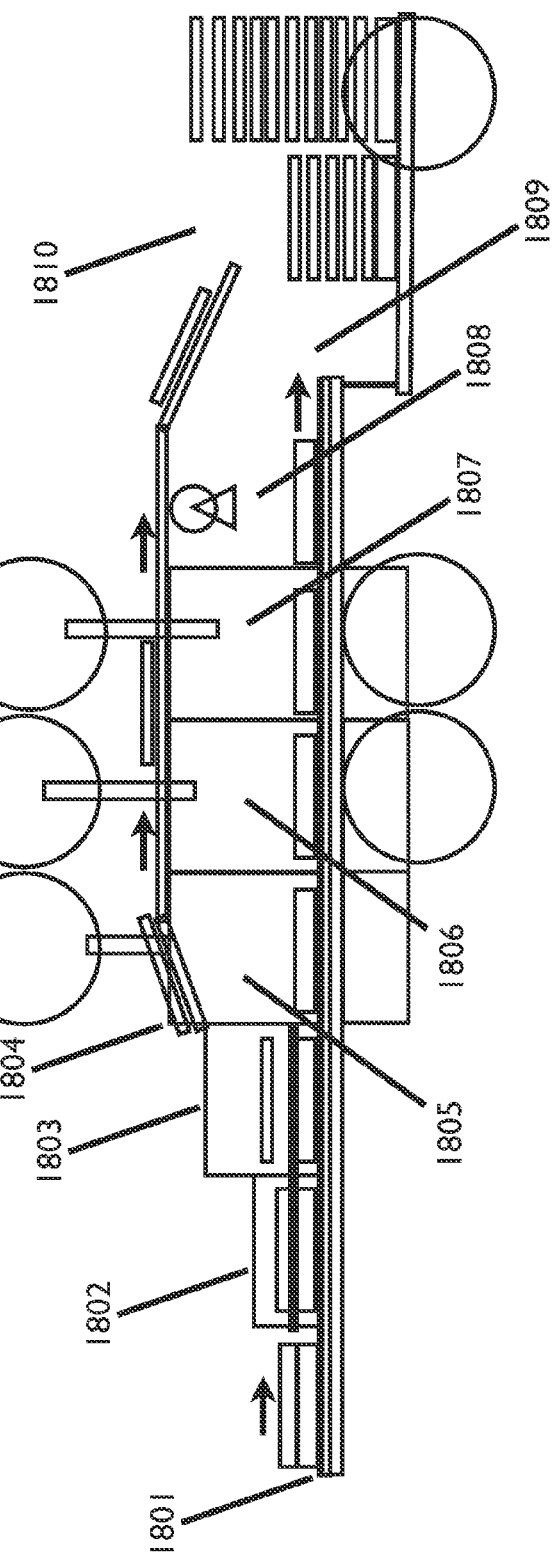

FIG. 18 generally illustrates one embodiment of a harvesting and planting apparatus.

Figure 19:
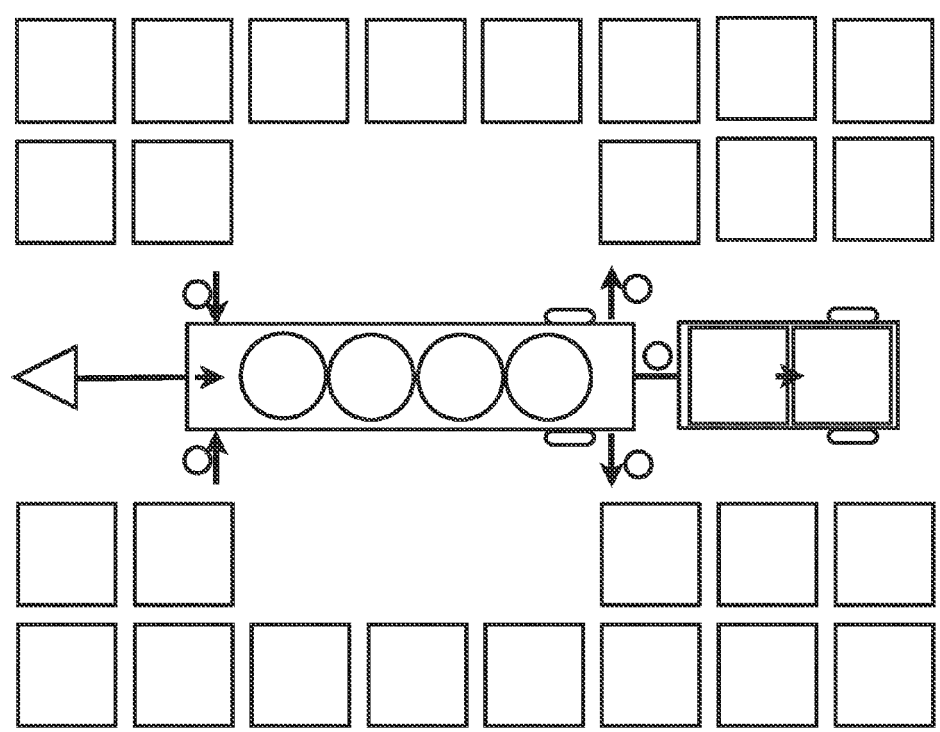

FIG. 19 generally illustrates one embodiment of a harvesting and planting apparatus being used to harvest and plant sod.

Figure 20:
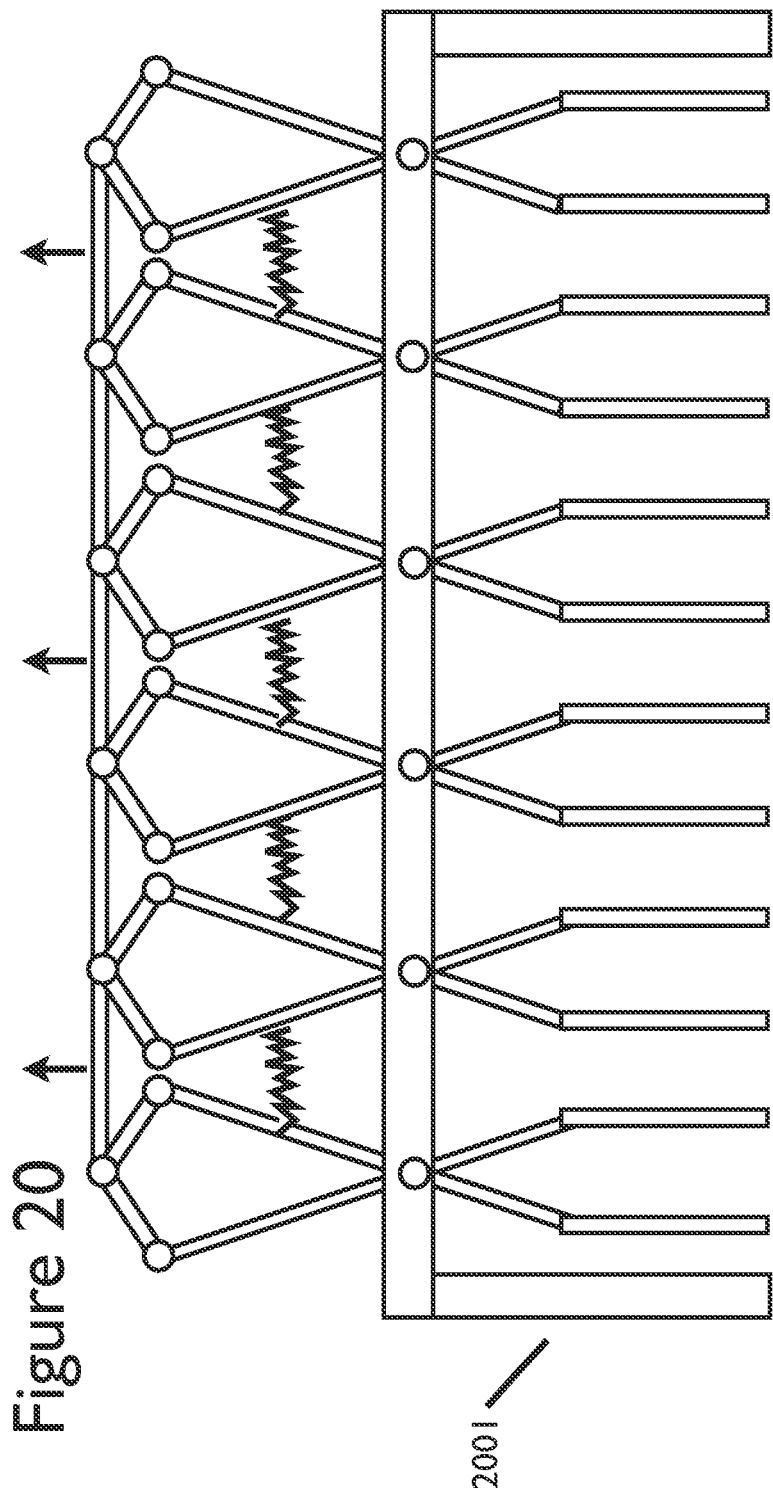

FIG. 20 generally illustrates one embodiment of a harvester grasper.

Figure 21:
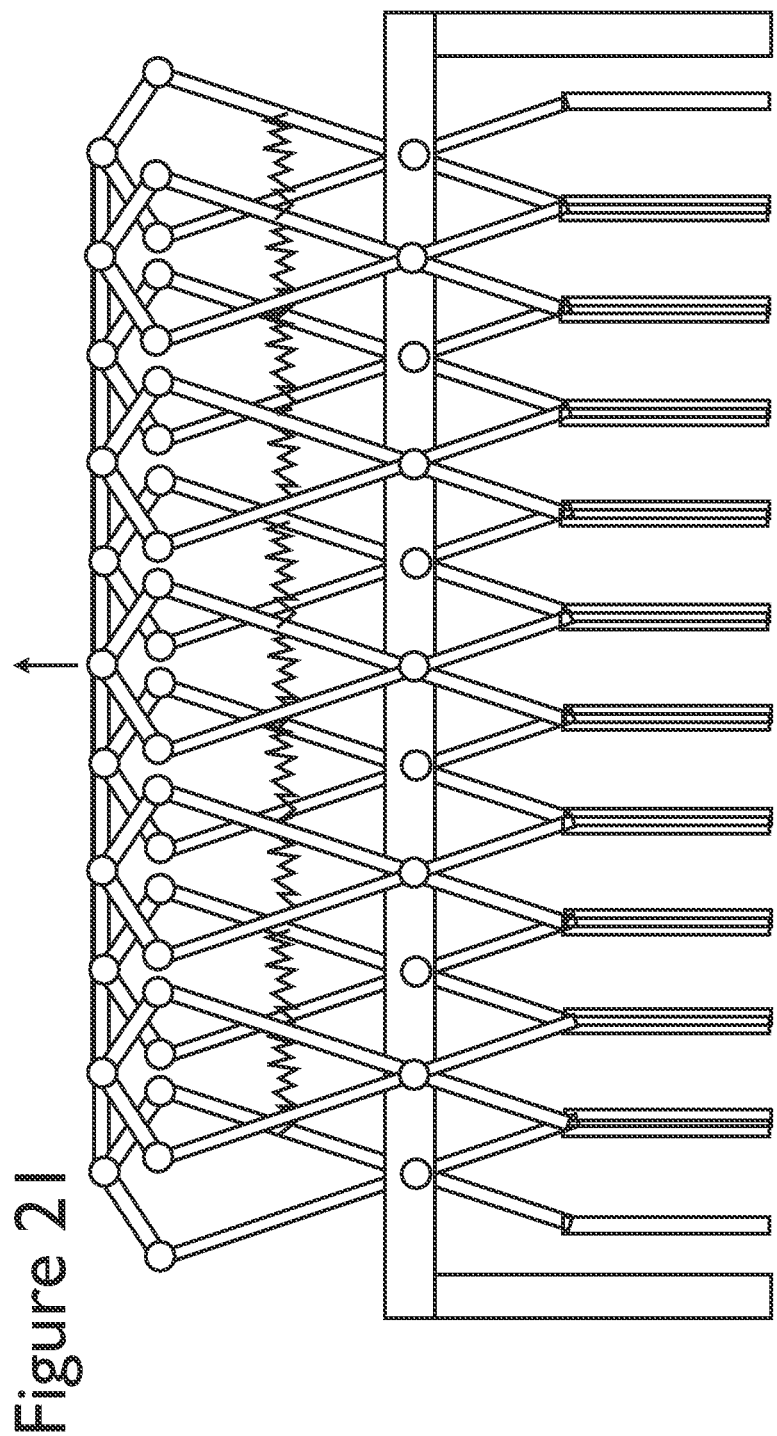

FIG. 21 generally illustrates one embodiment of a harvester grasper with offset graspers.

DETAILED DESCRIPTION OF THE PREFERRED EMBODIMENTS

In a preferred embodiment, the current invention may include the following although it is contemplated that combinations may be utilized to provide further advantages and so forth as generally referred to in the application and illustrations described below.

Referring to the illustrations, FIG. 1 generally shows the prior art of conventional methods of growing sod, wherein seeds (101) are planted in topsoil or soil (102). Roots (103) grow into the topsoil (102) and sod (104) is harvested and removed from underlying soil (105). Often times, it is in this soil layer (102) where synthetic root structures, such as plastic netting, are placed.

FIG. 2 generally depicts a preferred embodiment of invention 10. With various methods of growing soilless sod, a layer of impervious material or layer (201) is placed between the soil (102) and the growing medium.

FIG. 3A generally illustrates growing medium (301) above impervious material or layer (201). When soilless sod is harvested, the growing medium (301), along with plants (302), and their interwoven root structure (303) are lifted from the impervious layer. In such a case, the underlying soil is not removed.

FIG. 4 generally illustrates a comparison of growing sod with conventional means versus growing soilless sod. With conventional sod growing methods, expensive equipment is needed to prepare the soil and plant the seeds, as well as to harvest the sod. Once the ground is readied and the seeds are planted, it takes nearly eleven months for the sod to mature to the point of harvesting. This lengthy crop growing time is required to allow for the root structure to be strong enough to support the sod and prevent it from tearing after harvest. To further expedite this time, a woven matrix is often laid to provide synthetic structure for the sod, and prevent it from ripping. This synthetic structure remains in the sod for years, and becomes a hazard to animal life and is environmentally unattractive, as it often becomes visible once the sod dies, or erosion takes place.

With soilless sod growing techniques, the seeds and growing medium can be spread over the prepared surface, and then within a relatively short period of time, typically about a month, they can be harvested. Harvesting soilless sod does not require cutting into the ground, and therefore the sod is lifted off of the surface like a carpet. It does, however, similar to conventional methods, typically need to be cut to be harvested. Still further, because of the relatively short growing period, and weak root structure, synthetic root structure is often placed within the soilless sod to strengthen it for harvesting quicker.

Existing soilless sod growing methods typically require large hydro-seeding equipment or other equipment to spray or spread the growing medium across the surface, and require harvesting equipment to cut, lift, and/or harvest the sod. Because of the requirements of existing soilless sod growing methods, large dedicated farms are required to make it practical. There is a need for more cost effective and simpler growing and harvesting methods for soilless sod, to allow a greater number of people and entities to grow the sod products.

In a preferred embodiment, a method of growing soilless sod may be created whereas there may not be a requirement for large equipment to prepare or harvest the sod, thereby making its growing more practical for more people or entities. Still further, to make such a method practical and cost effective, it would need to lower the cost of the growing medium, not require expensive or expansive ground preparation, be repeatable, and shorten the timeframe from planting to harvest as much as possible.

In a preferred embodiment, the procedures and methods of planting, growing, and harvesting sod may use alternative approaches than those found in existing or conventional sod growing methods, and overcome the existing limitations.

Still further, the term soilless sod should not be considered limiting, as actual soil may or may not be used with the disclosed. In general there may be advantages to using non-soil growing mediums, including but not limited to reduced weight, cost, and simplicity of growing and harvesting. In this disclosure, a growing medium may be used to help maintain moisture for the plants, and such growing medium may encompass any number of organic or non-organic matter, including soil or non-soil based mediums.

As is illustrated in FIG. 5, in a preferred embodiment, the use of growing trays may be used to assist in the preparation, growing, and harvesting of soilless sod. In such a case, such trays may be used to provide optimized and consistent growing preparation, provide protected and stable growing, simplified harvesting, reduced costs, and engineered characteristics of the natural sod.

In a preferred embodiment, such trays may encompass any number of characteristics. Those described herein shall not be considered limiting, but rather are meant to illustrate certain embodiments of such a device and method.

In a preferred embodiment, such trays may use a series of protruding shapes (501) to take up space within the growing area, and specifically from growing medium. Such shapes may be formed in any number of arrangements, sizes, positioning, and shapes.

Such shapes (501) may be used to create engineered-enhanced characteristics of the natural sod growth. Unlike using genetic manipulation or synthetic root structure material to enhance the strength and growing capabilities of sod, the present invention uses engineering to guide the existing natural characteristics of organic sod in a manner, which further enhances its particular use in man-made commercial applications.

In such a case, the natural plant root structure may grow over, around, and between such shapes (501), allowing for a guided and directed interwoven root mat-like structure to be formed. The roots of the various germinated plants above may tend to grow downward toward the deepest part of the growing medium, in between such shapes (501) where more water or moisture may be found. These roots may be inherently guided into engineered narrow paths where they become interwoven. The interwoven nature of the roots creates added strength for the sod, and allows a broad area of sod to be strong enough for transport and transplant.

With conventional soilless sod growing techniques, as is illustrated in FIG. 6A, the germinated seeds or plants' roots migrate in varied directions within a growing medium. The interwoven nature of such roots has minimal strength, as their strength is spread throughout the entire growing area. Until the plants are further matured, the roots will not be interwoven enough to provide adequate strength for transplantability.

Conversely, FIG. 6B illustrates engineered directed root structure growth between the shapes (501). In such an illustration, the roots from the germinated seeds and plants (601) across the entire surface are purposely guided and directed to grow in a specified direction, further promoting the roots to be interwoven into a structure that is quickly strong enough to transplant and harvest.

By incorporating such shapes (501), the volume of the required growing medium is also further reduced. This amount of reduction in growing medium is dependent on the shape, volume, and spacing, amongst other characteristics of the shapes (501). In a preferred embodiment, the amount of space that is taken up is maximized, in balance with providing ample root structure to be formed among and between such shapes, to allow for a strong interwoven carpet of sod to be created.

In a preferred embodiment, the shape's height is such that enough depth is provided for sufficient root growth and moisture retention. Further, in a preferred embodiment the amount of space between the shapes (501) may be such that it is minimized to reduce the amount of required growing medium. Such shapes may be aligned linearly, as in FIG. 7A, or may be nested as in FIG. 7B, amongst others. Geometrically, the illustration in FIG. 7B represents less space in between the shapes (501) for the root structure to be formed within.

The diameter or width of such shapes (501) may be such that the plant's roots can effectively grow down the span of the shape (501), into the deepest part of such growing tray (502), and interweave with other plant's roots. If the shapes (501), for instance were quite large, the roots would be required to grow a longer distance to reach other roots, and becomes interwoven. If the shapes were very small in width, the roots would inherently be more spread out across the entire growing area, and have less focused interweaving. In a preferred embodiment, the relative diameter of such shapes (501) may be approximately ½ inch to 1½ inches, though they may also be smaller or even larger, even significantly larger, and of which may be somewhat dependent on the type of plants being planted on such surface.

In a preferred embodiment, the proximal contouring of such shapes (501) may be such that there may be a progressive downward curvature, or may have a relatively flat proximal surface before curving downward. The roots in the preferred embodiment may track downward toward the most concentrated and most distal areas, and become more highly interwoven in such locations. The amount of progressive curvature may be modified in many various patterns or natures, and should not be considered limiting. Such shapes (501), by way of example, may be relatively dome shaped, whereas there would be a progressive lowering in height, and concentration of roots in between the other various dome shapes. Further, the shapes (501) may be oblong dome shapes, whereas they may be elongated domes to still further take up space of growing medium, and allow a longer distance for the roots to travel downward. Still further, the shapes (501) may be hexagonal dome shaped whereas the perimeter of such shapes may not be round, but rather straight edges or relatively straight or slightly curved, as is illustrated in FIGS. 10 (and 6B). The shapes (501) may be any number of other shapes, any examples should not be considered limiting, as such examples help clarify advantages and disadvantages of combinations and variations of shapes within such overall structure. Any embodiment does not necessarily require a uniform shape throughout, but may use any combination of various shapes (501) throughout the growing surface.

An advantage of using a shape such as a domed hexagonal shape, as is illustrated in FIG. 10 may allow for a closer proximity of the shapes (501) to one another on the distal most aspect of the growing surface. With such, the root structure would be more tightly formed in an interwoven nature with each other, as well as have a reduction in required growing medium.

The space between any shapes (501) across the tray (502) or other such growing surface may be close in proximity or may be spread out. An advantage of having such shapes (501) close in proximity, is that the roots would be forced closer together, to increase their interwoven nature with each other. In such, especially as the shapes (501) have a tapering contouring (as is illustrated in FIGS. 8, 9 and 10) the interwoven nature of the roots may become stronger and more robust in the deepest most distal areas. In a preferred embodiment this space between the shapes (501) may be ¹⁄₁₆ inch to ⅛ inch, however this should not be considered limiting as they may be closer or further or even much further apart, and which may be dictated somewhat by the type of plant and the plants root characteristics. The type of plant that is grown, and its inherent growing characteristics, will be a factor in determining the optimal or preferred size, shape, and other characteristics of the shapes (501).

Still further, the shapes (501) may be used to help prevent erosion of growing medium. With conventional soilless sod growing methods, wind and water erosion poses a significant challenge. Because the growing medium, and root structure, sits on top of the ground surface, there is no mechanical advantage of the plant roots to keep it from eroding away. With excessive rain, the growing medium easily gets washed away with rain run-off. With high wind, the growing medium can easily be lifted and blown, or even the top surface of the growing medium can be blown away. Conventional soilless sod growing techniques often use plastic sheeting that can itself be lifted due to the Bernoulli effect, and hence cause the growing medium to be blown away.

Using volume reducing shapes (501) provides mechanical stops to prevent both water and wind erosion. As excessive rain or wind may come in contact with the growing medium, it is held in place from moving by being wrapped around the shapes (501).

Such shapes (501) may be any uniform or non-uniform shape, but in a preferred embodiment, they may be nested domed or hexagonal dome shapes. By having domed or hexagonal dome shapes, it may provide for an inherently strong surface, hence requiring less material to provide necessary strength and integrity of the shapes (501) and trays (502) in general from collapsing or distorting. To further enhance the strength of such shapes (501), additional structure may formed on the underside of the shape (501). In such an example, the trays may be formed out of a relatively thin material, and geometrically integrated structures such as this may be used to enhance the tray's strength. Conversely, the domes may be solid in nature. Such structural components may be formed in a variety of patterns, and such illustrations should not be considered limiting.

The growing trays (502) may as well be made from various types of materials, including plastics, laminates, metals, natural materials, STYROFOAM, or other materials. In a preferred embodiment, injection moulded, thermoformed plastics, or other methods, including STYROFOAM (and the like) forming may be cost effective for production. It is understood that other existing materials may be used to enable the growing of such a system, including but not limited to BUBBLE WRAP, seeding trays, mats, or other such products with shapes that exhibit similar characteristics of which sod may be grown on.

In a preferred embodiment, the proximal perimeter edge surface of the trays may be relatively flat without protrusions extending beyond the proximal surface level of the growing medium. This may assist in preparing the growing medium within such tray system. The tray (502) size may be large or small, but in a preferred embodiment, may be sized for such that the sod section may fit on a pallet, so that the sod sections may be stacked flat on a pallet. It is understood that for modified application, various other sizes may be preferable and such size variations should not be considered limiting. Conventional sod pallets sizes that are often used are 48 inches by 42 inches, although the tray dimensions for growing sod at a particular size may also be 48 inches by 40 inches, 45 inches by 45 inches, and other such sizes to fit on or within conventionally used sod pallet sizes. It is understood that other sizes may be used, including not just square shapes, but rectangular shapes, amongst others. This may include long strips, large carpets, hexagonal, or a variety of other shapes. In a preferred embodiment, flat sections that may fit on a standard pallet may be most economical, practical, and desired because of the efficiency of how they may be able to be stacked.

In a preferred embodiment, the trays may be able to be stacked in a manner to which many trays may be grown above the trays' ground footprint. Such stacking may occur through external shelving or equivalent means, or may occur through inherent or associated geometry or engineered protrusions or legs within the design of such trays (502). The latter may enable for a practicality and cost reduction of such a growing method.

In a preferred embodiment, the ability to grow the sod in a stacked orientation has advantages of reduced capital requirements, simplicity, and space considerations, amongst others. The distance between such stacked trays (502) may be considerably close, or may be at a greater distance. Depending on the plants requirements, the amount of light needed to reach the plants across the tray surface will vary. While this distance may be close or far, in a preferred embodiment, this distance may be as close as possible, while maintaining the health and integrity of the plant. The tray spacing may be adjustable, or may be fixed.

Referring to the illustration in general and more specifically to FIGS. 11A and 11B, in a preferred embodiment, for cost reduction and simplicity, built in or attachable spacers (1101) may be used to offset one tray from another in a stacked orientation. Such spacers (1101) may be designed in any number of shapes, designs, or orientations, and the illustrations should not be considered limiting. The spacers may be constructed in a manner in which they may be attached to the trays, in a permanent or semi-permanent manner. Advantages of doing so, would be for the trays to be able to nest into one another for more efficient transport or shipping, and then such spacers may be attached for benefit of use in providing space between stacked trays. Conversely the spacers may be integrated in with the design of the tray in such a manner to which they add to structural integrity of the design. In such a case, the orientation of such legs may still allow for the trays to be stacked in a nested orientation, which may require alternating the trays at 90 degrees from one another.

Additionally, the spacers may be solely around the perimeter of the trays, or may also have spacers within the interior of the trays as well. The latter may have advantages of allowing the trays to be of lighter or less material, and such spacers may allow for more of a level stacking orientation, versus sagging, due to the span of the trays. The interior spacers may be numerous, or may be few in number, but in a preferred embodiment may be between 1 and 9, in order to minimize the impact on the underlying sod surface. There may as well be various attachment points for the spacers on the underside of the trays, so that spacers may be positioned in a variety of orientations, depending on use. In a preferred embodiment, the material and design of the trays may be such that no interior legs or spacers would be required, and that such spacers may reside along the outer perimeter and not within the growing area. The determination of legs or spacers within the growing surface is a function of tray design and material, and should not be considered limiting.

The trays may also be fabricated the compliancy, instead of relatively rigid in nature. In such an example, they may be fabricated from a thin sheet of thermoplastic (by way of example only) which may not provide enough structural integrity to maintain a flat tray when listed, but may provide sufficient strength to hold its form when in combination with other materials to assist in it holding its form. By way of example, the thin plastic sheet tray may be placed over a sheet of plywood, sheet of STYROFOAM, or other mechanical structure to give the system the integrity to hold its necessary orientation, while not requiring an expensive fabrication process for making a thicker, stronger tray. Using such a method may also lend itself to processes discussed later such as floating the trays, where they may not necessitate as much structural integrity on their own since the underlying water and buoyancy of the trays, air pockets within or under the trays, or other buoyancy mechanisms to hold the tray in its preferred positioning and orientation.

The trays (502) may have a perimeter edge (504) around them that may hold water, or may have water ports to prevent pooling of water. Such water ports may allow for full or partial evacuation of water from the trays. In some cases, it may be beneficial to retain a certain amount of moisture in the trays. Because the roots are purposely directed toward the lowest point of the trays to enhance the strength of the sod matrix, such location retaining a certain amount of moisture may encourage the roots to seek these preferred areas.

FIG. 12A illustrates one embodiment of such water ports (1202). In such an example, the water port may be tapered so that the trays may nest in a stacked orientation for transport or shipping. Such trays may also have a lip (1201) in its distal area to maintain a certain amount of pooling in the deepest area of the tray (1301). The water port width may be relatively narrow to prevent the growing medium from eroding out of the tray, as well as to help maintain moisture within the remainder of the perimeter of the sod. There may be numerous water ports, or may be few water ports around the perimeter of the tray.

In a preferred embodiment, the water ports (1202) may be designed to extend over the edge of a laterally adjoining tray. In such a case, any water in one tray may drain into an adjoining tray. This may be helpful to allow for flood irrigation from one tray to the next over a series of trays. In such a case, the water port size may be wider. Additionally, a broader area of one side of the tray may have a lip that extends over a broader area of an adjoining tray, to allow for a broader adjoining of trays, to assist in irrigation and water retention.

In a preferred embodiment, the tray may likewise have conventional distal water drain holes as is illustrated in FIG. 12B. In such an example, there may be perimeter drain holes (1203) and more center oriented drain holes (1204), all of which may be any number of drain holes all together, and such image should not be considered limiting. Roots (1304) may tend to grow through any such exit point, which may increase the difficulty of removing the sod from the tray, therefore the size and shape any such distal drain holes may be such that it allows for roots to easily be pulled back through upon harvesting. In a preferred embodiment, the water ports (1202) may be made such that if any roots did grow out of them, there would be negligible resistance lifting the sod out of the tray.

FIG. 13A illustrates a cross sectional view of one embodiment of a preferred embodiment of the trays (502). In such an example, the shapes (501) may exhibit a progressively tapered orientation toward the deepest section of the tray (1301). FIG. 13B illustrates a similar embodiment of the trays, though with sod. Growing medium (1302) may be filled toward the top perimeter edges of the trays (502), which may be a certain height above the top of the shapes (501). In a preferred embodiment, and to maintain as little growing medium required, and for the requirements of growing such plants, approximately ⅛ (though may be less or more) of growing medium may remain above the shapes (501). Such growing medium may allow for the seeds, or germinated plants to grow across the entire top surface, or may be purposely grown over a non-continuous surface. It should be noted that the growing medium may be purposely left out, and allow solely the plant roots to extend into such area. In such an example there is added necessity for maintaining appropriate moisture levels within the roots areas, as the growing medium may tend to help maintain moisture itself.

By way of example, FIG. 13C illustrates germinated plants (1303) growing within the growing medium (1302), which roots (1304) may tend to grow downward around the proximal surface of the shapes (501) toward the deepest portion of the trays (1301), and interweave with other plants' roots (1305). It is this interwoven root area (1305) which gives the sod its strength.

Through using means of maintaining moisture in the tray designs, it is conceivable in a preferred embodiment to not require growing medium. In such a case, a fabric or other mat across the top of the shapes may have seeds sprinkled across its surface, which may germinate, and whose roots may extend through such surface and into the areas in between the shapes. By doing such, the maintenance of moisture in the areas between the shapes may allow for the roots to gather the nutrients and hydration necessary for plant growth. Additionally, as the roots grow, they may wind around other roots, forming the structural benefit of the sod mat, while not requiring growing medium.

FIG. 14 illustrates matured interwoven root structure (1305) after having been removed from the growing tray (502). The area of interwoveness may not simply reside at the most distal aspect of the growing area, but may progressively extend upward toward to top aspect of the sod section—here referred to as the interwoven region (1306). By giving a vertical structure with progressively interwoven roots, it may provide a much stronger sod. Similar to the strength connectivity of netting or of a honeycomb shape, any force that is applied to pulling apart the sod in a lateral direction would spread across the various netting or honeycomb like structures throughout a large portion of the sod, reducing any particular point pressure in a specific area, and hence increasing the durability of the sod as a whole.

FIG. 15 illustrates how the trays may look in a stacked orientation. Such trays may be stacked over a pallet (1501). In such an example, the stack of trays may be moved easily. The trays (502) may have a stacking system that may include integrated security points (503) which may allow for a series of trays to be connected together, such as with a long rod, or other such means, to enable the stack of trays to be connected for added security from tipping over or sliding off.

Any integrated legs or stands may be protruding from the bottom of the tray, or from the top of the tray, or may be removable. Additionally, through either having removable legs, or no legs, the trays may be able to be floated. In such an example, the use of a specialized irrigation system for water to flow over, around, or under the trays may provide a means of maintaining the necessary moisture for the trays. By doing such, the moisture level may be brought up to the necessary level on the trays, to provide nutrients and moisture to the plant roots, and then allowed to drain back out of the trays as necessary for optimal plant health. In addition, the tray may be designed to float fully or partially, allowing for water to penetrate the area of the roots, in between the domes. By doing such, the trays may not only be watered efficiently, but may allow for a mode of transport of the trays from one location to another, including cycling the tray location with respect to sunlight availability. Such trays may float via integrated floatation mechanism such as STYROFOAM, plastics, enclosed air pockets, or unenclosed air pockets. In the example of using unenclosed air pockets, air may be pumped into the surrounding water, allowing for bubbles to rise underneath the trays, thereby filling areas such as the underside of the domes and areas such as the underside of the side walls of the trays. As these areas may capture the rising air bubbles and get trapped, it may allow the tray to maintain the preferred level of buoyancy within the water to allow enough moisture to flood into the tray in between the domes, and water the plant roots.

In order to help prevent stagnation of water within the trays, the water may be cycled in and out of the trays. This may be accomplished by tilting the trays from time to time, allowing the water to flow out of the tray, then fresh water can be added back into the trays.

FIG. 5A illustrates one embodiment of the perimeter edge (504) of the tray. The perimeter edge may use various types of embodiments, it may be beneficial to help reduce evaporation, provide a clean, uniform edge to the sod product, and help prevent erosion of the growing medium. Such edge may use a tapered angle in order to allow for such trays to nest together for transport or shipping. Still further, such edges may be straight or curved in nature. The height of the perimeter edge, in a preferred embodiment, may be slightly higher than the height of the shapes (501) in order to assist in the filling of the trays to a preferred height, allowing a slight covering of the shapes (501) with growing medium. The perimeter edges may be rigid, semi-rigid, or flexible, but in a preferred embodiment may have enough rigidity to assist in the filling process.

The perimeter edges may as well utilize means for overlapping the perimeter edge of one try with another adjoining tray. This may help prevent wind from lifting trays that may be placed outdoors in the open. Still further, the perimeter edges may use holes or other means of mechanically joining trays together, or to use other external security apparatus such as but not limited to zip ties or stakes to help prevent their movement from wind. The perimeter edges may also be removed to allow the trays to be combined, to allow for a larger surface area to be created, and hence a larger section of sod.

Because of the incorporated shapes, the root structure of the plants may form to the surface of such shapes, and may maintain such shape after their removal from the tray surface. With the interwoven nature of the roots of the various plants, they may tend to maintain such shape, allowing for the underlying surface of such sod to look like the inverse of the surface of the tray. With the tapering effect of the root shape, due to the shapes on the tray, the sod may more easily be pressed into soft or tilled ground, allowing the undisturbed roots of the plants to be pressing into soil, making the sod healthier quicker. Likewise, because the roots will have not been disturbed—meaning uncut as is found with conventional sod—the sod plants will likely maintain better health over conventional sod.

The sod root structure, due to growing around the tray shapes, may allow for the sod to have significantly increased strength and durability for handling. It may inherently resemble a grid structure of sorts. Therefore, sections of such sod may be cut into various shapes to create or integrate with other structures, and used for a variety of applications other than what conventional sod applications may limit. In addition, the perimeter edges of such trays may be removed to allow for a much broader surface to be created, and hence a larger carpet-like or continuous structure of sod. Still further, the tray shapes should not be considered limiting, as they may be flat, curved, domed, or other such shapes. It should be understand that the term sod should not be considered limiting. The term sod may encompass any structure of plants where numerous plants and their associated roots may be interwoven in a manner in which a mat-like structure is formed. This may include grass, weeds, ground-covers, wild-flowers, flowers, trees, shrubs, moss, or other types of plants, and any combination of plants. In any such case, the application of the sod may allow for a surface to be covered by a type of plant or combination of types of plants through the sod product.

Through the disclosed growing method, various types of sod may be produced, which would not be practical in conventional sod growing practices. For instance, certain types of sod, which would not grow in a particular climate, may be grown through the disclosed method in a greenhouse or not in a greenhouse, relatively quickly. Where conventional sod may require a long growing cycle, and hence various seasons within a region, the disclosed sod growing method may allow for quick growth cycles, allowing for sod types to be grown in climates where certain seasons would not otherwise permit the sod to be grown in conventional methods. This may include certain grasses or combinations of types of plants.

As illustrated in FIGS. 16A and 16B, sections of the sod may also be cut into various shapes, which may then be folded into three-dimensional shapes to form or be integrated with other desired objects. By way of example, the inner surface of a window box may be lined with such sod. The sod may provide the soil erosion prevention that coconut mats or other similar products would otherwise provide, yet allow for the entire surface of the window box to be filled with living plants. Their roots may grow toward the inward surface of such container. The types of plants may additionally be selected to promote the aesthetic nature or health of the container as a whole. For instance, clover may be used within the sod to allow for nitrogen to be naturally increased in the soil, thereby promoting the health of the other plants within the container.

In a further example, a section of the sod may be cut into a pattern such that it may be rolled into a shape that resembles the shape of a conventional plant pot, as is illustrated in FIGS. 17A and 17B. Such sod may be created, formed, or attached together such that it may maintain such shape. Likewise, it may be placed with an external form to help maintain such shape after being filled with dirt.

By way of example, the use of synthetic or organic woven, cloth, or similar materials (altogether herein referred to as cloth) may be used to help maintain such shape, and may be used to further enhance the properties of the roots interwoven structure. Likewise, the cloth may be formed into the desired shape, such as but not limited to a plant pot, and growing medium, seeds, or other such materials may be pressed into the cloth. Once the structure would be filled with dirt and watered, such seeds may then sprout, creating a pot structure that is "living". The roots, which may grow in and around such cloth may help promote the strength of the structure as they mature. This may be used to form shapes similar to conventional plant pots, planting containers, window boxes, and the like.

In such an example, the cloth material in reference may use a three-dimensional polyamide mat with an open structure. Within such artificial root structure of the synthetic or organic equivalent, the growing medium and seeds or plants may be integrated into such spaces within the mat structure to allow for three dimensional shapes to be grown. The geometric shape and structure of the mat may promote the roots to grow in a particular orientation to further promote the strength of the structure. Similarly, the interwoven nature of the mat may help reduce erosion of the growing medium and seeds, yet allow for the plants to grow out, providing a visual perspective of the plants, and limited visual perspective of the underlying structure.

Mounting locations may also be integrated into such trays, to allow for various types of synthetic or organic woven, cloth, or similar material (altogether herein referred to as cloth) to be placed across the surface of the trays. In such an example, plant seeds may be placed over the surface of the cloth, with growing medium over their top. As the plant roots may grow through the cloth material into and around the underlying shapes, and any such contained growing medium or hydroponic solution, the cloth may add to increased strength and durability of the planted structure, and hence may lessen the time until harvest. Any growing medium, which may be placed over the top of such cloths and seeds, may be used to maintain moisture of the germinating seeds, as well as help prevent erosion. In an alternative embodiment, such cloth material may as well exhibit contouring similar to the shape of the shapes, which such roots may grow into or through.

By using such trays for growing sod, an improved method of planting and harvesting may be utilized. In such an example, an automated, semi-automated, or manual system for planting and harvesting may be created. In a preferred embodiment, using such trays may lend to the ability to harvest and plant simultaneously, or in conjunction with one another.

At the end of the growing cycle, and ready for harvest, a tray may be placed into an apparatus that may harvest the sod out of the tray. The empty tray may than go through a further aspect of the apparatus where growing medium may be deposited into such tray, along with seeds, sprigs, germinated seeds, or the like. Then another layer of growing medium may be sprinkled over the top of such, and in essence prep the tray for another round of growing. In such an example, the growing medium and seeds or germinated plants or the like may be pre-mixed together, or may be applied in separate processes. Still further, by pre-germinated the seeds, the growing time to harvest may be reduced.

In certain circumstances, it may be beneficial to apply water to, within, or over the growing medium and seeds at time of applying to the tray to reduce immediate wind erosion before a full watering may take place. Likewise, the plants or seeds and growing medium may be pre-mixed and slushed into the trays in a wet manner.

Referring again to the illustration in general and more particularly FIG. 18, because the trays lend themselves to the ability to be in stacked orientation, having a harvester/planter apparatus, which is mobile, may have certain advantages. In such an example, such apparatus may be moved down a row of trays ready for harvest, trays may be unstacked and placed onto a conveyor (1801), where they may pass through a mower mechanism (1802), pass through a harvester mechanism (1803), where the sod may be removed from the tray and moved for stacking (1804). The tray may then pass through a means of depositing growing medium into the distal areas of tray (1805), then pass through a mechanism for depositing seeds over and/or within growing medium (1806), then pass through a means of depositing another layer of growing medium over seeds (1807), then pass through a mechanism for spraying water over the top of the seeds and growing medium to prevent wind erosion (1808). The trays may be then removed and restacked (1809). Meanwhile, the harvested sod may be stacked on pallets and readied for transport (1810). It should be understood that the above is an example only and may be implemented in any number of or combination of parts, altogether or separate.

In such an example, the apparatus may be mobile, as shown in the figure in a trailer setup, or may be stationary. If used in a mobile version, as is illustrated in FIG. 19, the process may be quite efficient, as trays may be unstacked for harvesting, placed on the conveyor, and restacked in ready to grow format as the apparatus moves down the line. This method may limit the amount of times that trays would need to be moved and overall lower manpower requirements.

Another such example of the systematic process of planting and harvesting in an efficient manner would be to use means of moving the trays along an assembly line to move them to a central location where they may be planted and harvested. By doing such, the manpower and equipment for harvesting and planting necessary may be lessened. This approach may be integrated in with an irrigation system to allow the trays to float to such a location, or they may use a conveyor type system, or may be moved using gravity.

FIG. 20 generally illustrates one embodiment of a harvester mechanism. In such an example, it may be beneficial to pick up the sod by the grass for instance, in many locations across the sod's surface, thereby limiting the point pressure on any one aspect of the sod. FIG. 21 generally illustrates how such graspers may be staggered across the sod surface to provide more graspers for lifting the sod.

It may be advantageous to lift the sod with relatively uniform pressure across the sod's surface within a number of graspers. This may be accomplished by an engineered lever system whereby as a handle may be lifted, each of the claspers may together grasp their respective areas of the sod. These may be spring activated to be open in the resting position, or may be closed in the resting position. Likewise, as the grasper mechanism may be lifted, it may cause the fingers of the graspers to close around the sod leaves, thereby lifting the sod. Likewise, the fingers of the graspers may have springs to maintain a minimal pinch force in the closed position, thereby allowing for all of the graspers when lifted to exhibit no less than a threshold to lift the sod, maintaining consistency in function.

Such a mechanism may include legs (2001) which may be used to help position the mechanism over the sod trays, and may generally fit within the stackable positions of legs over the sod trays. By doing do, they may help maintain consistency in grasping the sod at a preferred level above the sod's surface.

This process may be automated or may be manually operated. It is further contemplated that combinations of both automated and manually operated.

Changes may be made in the combinations, operations, and arrangements of the various parts and elements described herein without departing from the spirit and scope of the invention.

I claim:

1. A growing tray system for growing plants having a surface for the promotion of interweaved root growth comprising:
    a surface having a top and a bottom;
    a plurality of raised shapes on said top of said surface wherein said plurality of raised shapes nest together in two-dimensional space and wherein said plurality of raised shapes are hexagonal domes; and
    a proximal surface around said raised shapes on said top of said surface wherein said roots grow downward around said proximal surface of said shapes into interweaved geometric bundles.

* * * * *